United States Patent
Taylor et al.

(10) Patent No.: US 7,971,438 B2
(45) Date of Patent: Jul. 5, 2011

(54) GAS TURBINE ENGINE HAVING A HEAT EXCHANGER ARRANGEMENT FOR EXHAUST GAS FLOWS

(75) Inventors: Mark D Taylor, Derby (GB); Frank G Noppel, Bedford (GB); Ritindar Singh, Cranfield (GB)

(73) Assignee: Rolls-Royce plc, London (GB)

( * ) Notice: Subject to any disclaimer, the term of this patent is extended or adjusted under 35 U.S.C. 154(b) by 1088 days.

(21) Appl. No.: 11/797,442

(22) Filed: May 3, 2007

(65) Prior Publication Data

US 2008/0072577 A1 Mar. 27, 2008

(30) Foreign Application Priority Data

May 5, 2006 (GB) .................................. 0608859.5

(51) Int. Cl.
 *F02C 1/00* (2006.01)
 *F02G 3/00* (2006.01)
(52) U.S. Cl. ...................................... 60/728; 60/39.511
(58) Field of Classification Search .................... 60/728, 60/39.511, 39.55, 39.5
See application file for complete search history.

(56) References Cited

U.S. PATENT DOCUMENTS

| | | | |
|---|---|---|---|
| 3,517,505 A | | 6/1970 | Anderson |
| 4,244,191 A | * | 1/1981 | Hendriks ........................ 60/728 |
| 4,509,324 A | | 4/1985 | Urbach |
| 4,829,763 A | * | 5/1989 | Rao ................................. 60/775 |
| 6,044,640 A | | 4/2000 | Guimaraes |
| 6,089,024 A | * | 7/2000 | Hatanaka ........................ 60/671 |
| 6,247,302 B1 | * | 6/2001 | Tsukamoto et al. ......... 60/39.511 |
| 6,688,108 B1 | | 2/2004 | Van Liere |
| 6,739,119 B2 | * | 5/2004 | Erickson ....................... 60/39.53 |
| 6,910,335 B2 | * | 6/2005 | Viteri et al. ...................... 60/786 |
| 7,007,453 B2 | * | 3/2006 | Maisotsenko et al. ...... 60/39.511 |
| 7,134,269 B2 | * | 11/2006 | Walsh et al. ................. 60/39.53 |
| 7,757,475 B2 | * | 7/2010 | Sasaki et al. ................... 60/39.5 |
| 2002/0100271 A1 | | 8/2002 | Viteri |
| 2004/0035117 A1 | | 2/2004 | Rosen |
| 2004/0144099 A1 | * | 7/2004 | Coleman et al. ................. 60/791 |
| 2005/0193714 A1 | | 9/2005 | Walsh |
| 2006/0032228 A1 | | 2/2006 | Marin |

FOREIGN PATENT DOCUMENTS

| | | |
|---|---|---|
| DE | 10307606 A1 | 9/2003 |
| EP | 444913 A1 | 9/1991 |
| EP | 859136 A1 | 8/1998 |
| EP | 0 959 235 A | 1/2002 |
| EP | 1905964 A2 | 4/2008 |
| GB | 0 596 696 | 1/1948 |
| GB | 1 284 335 | 8/1972 |
| JP | 2002371862 A | 12/2002 |

OTHER PUBLICATIONS

European Search Report (completed Jan. 18, 2011).

* cited by examiner

*Primary Examiner* — Williams H Rodríguez
(74) *Attorney, Agent, or Firm* — Jeffrey S. Melcher; Manelli Denison & Selter PLLC

(57) ABSTRACT

Environmental concerns have resulted in consideration of the effects of condensation trails from gas turbine engines. By provision of a condensation stage in a heat exchanger arrangement for a gas turbine engine the level of condensation within a final exhaust gas flow G from an engine is reduced. Furthermore, by cooling of the exhaust gas flows for mixing with by-pass air flows a water partial pressure at an exhaust gas exit temperature can be provided which is below the eutectic liquid to vapor phase transition and therefore avoid condensation (contrail) formation.

10 Claims, 4 Drawing Sheets

US 7,971,438 B2

GAS TURBINE ENGINE HAVING A HEAT EXCHANGER ARRANGEMENT FOR EXHAUST GAS FLOWS

CROSS-REFERENCE TO RELATED APPLICATION

This application claims priority to Great Britain patent application No. GB 0608859.5, filed 5 May 2006.

BACKGROUND OF THE INVENTION

The present invention relates to gas turbine engines and more particularly to gas turbine engines utilised in aircraft for propulsion.

Referring to FIG. 1, a gas turbine engine is generally indicated at 10 and comprises, in axial flow series, an air intake 11, a propulsive fan 12, an intermediate pressure compressor 13, a high pressure compressor 14, a combustor 15, a turbine arrangement comprising a high pressure turbine 16, an intermediate pressure turbine 17 and a low pressure turbine 18, and an exhaust nozzle 19.

The gas turbine engine 10 operates in a conventional manner so that air entering the intake 11 is accelerated by the fan 12 which produce two air flows: a first air flow into the intermediate pressure compressor 13 and a second air flow which provides propulsive thrust. The intermediate pressure compressor compresses the air flow directed into it before delivering that air to the high pressure compressor 14 where further compression takes place.

The compressed air exhausted from the high pressure compressor 14 is directed into the combustor 15 where it is mixed with fuel and the mixture combusted. The resultant hot combustion products then expand through, and thereby drive, the high, intermediate and low pressure turbines 16, 17 and 18 before being exhausted through the nozzle 19 to provide additional propulsive thrust. The high, intermediate and low pressure turbines 16, 17 and 18 respectively drive the high and intermediate pressure compressors 14 and 13 and the fan 12 by suitable interconnecting shafts.

In view of the above it will be appreciated that when a gas turbine engine may be utilised for propulsion and in particular propulsion of aircraft the exhaust emissions from that gas turbine engine can have environmental impacts. It has been suggested that gas turbine engine emissions cause perturbations in the earth's radiation budget. This is particularly true for condensation trails or contrails and the emission of particles 2 which may result in aviation induced cirrus clouds. There is an ongoing interest to reduce environmental impacts.

SUMMARY OF THE INVENTION

In accordance with aspects of the present invention there is provided a gas turbine engine comprising a heat exchanger arrangement for exhaust gas flows, the engine characterised in that at least a part of the heat exchanger arrangement acts in order to dehumidify the exhaust gas flows in use by precipitation of condensation through super-saturation inducement relative to exhaust gas flow temperature and rate.

Typically, the heat exchanger arrangement includes a recuperative stage to recuperate heat in use from the exhaust gas flows in order to heat a combustion gas flow.

Possibly, the heat exchanger arrangement includes an intercooler stage to further cool the compressed gas flows.

Generally, the heat exchanger arrangement has a condensation stage between the recuperative stage and the intercooler stage, the condensation stage using a cooler fluid flow such as a bypass/fan flow or water to cool the exhaust flows after the recuperative stage. Typically, the heat exchanger arrangement has conduit paths for exhaust flows from the intercooler stage in order to provide mixing with spent ambient air flows from the condensation stage.

Possibly, the heat exchanger arrangement has a conduit path for condensate to a combustor. Generally, the conduit includes a collector for condensate and for distribution along the conduit path. Possibly, condensate presented to the combustor is to adjust water/fuel ratio or to facilitate water injection.

Possibly the condensate or water added to a combustor is to adjust the temperatures to reduce NOx emissions.

Generally, condensate or water injection is available continuously.

BRIEF DESCRIPTION OF THE DRAWINGS

Generally, the heat exchanger arrangement incorporates proportioning valves for regulating the exhaust gas flows.

An embodiment of the present invention will now be described by way of example only with reference to the accompanying drawings in which.

DETAILED DESCRIPTION OF THE INVENTION

In order to reduce environmental impacts from gas turbine engines it would be advantageous to remove water vapour from exhaust gas flows along with soot particles, aerosol emissions and provide a reduction in carbon dioxide and nitrogen oxide levels. However, such dehumidifying and cleaning of the exhaust flows must not be at the expensive or causing significant variation in performance levels with respect to thrust or fuel consumption. In such circumstances, although theoretically approaches which utilise fuel cells and similar mechanisms may be feasible such approaches require significant deviation from current gas turbine engine practise, so it would be more desirable to provide a practical solution or improvement with respect to existing gas turbine engine configurations.

Figure 1:
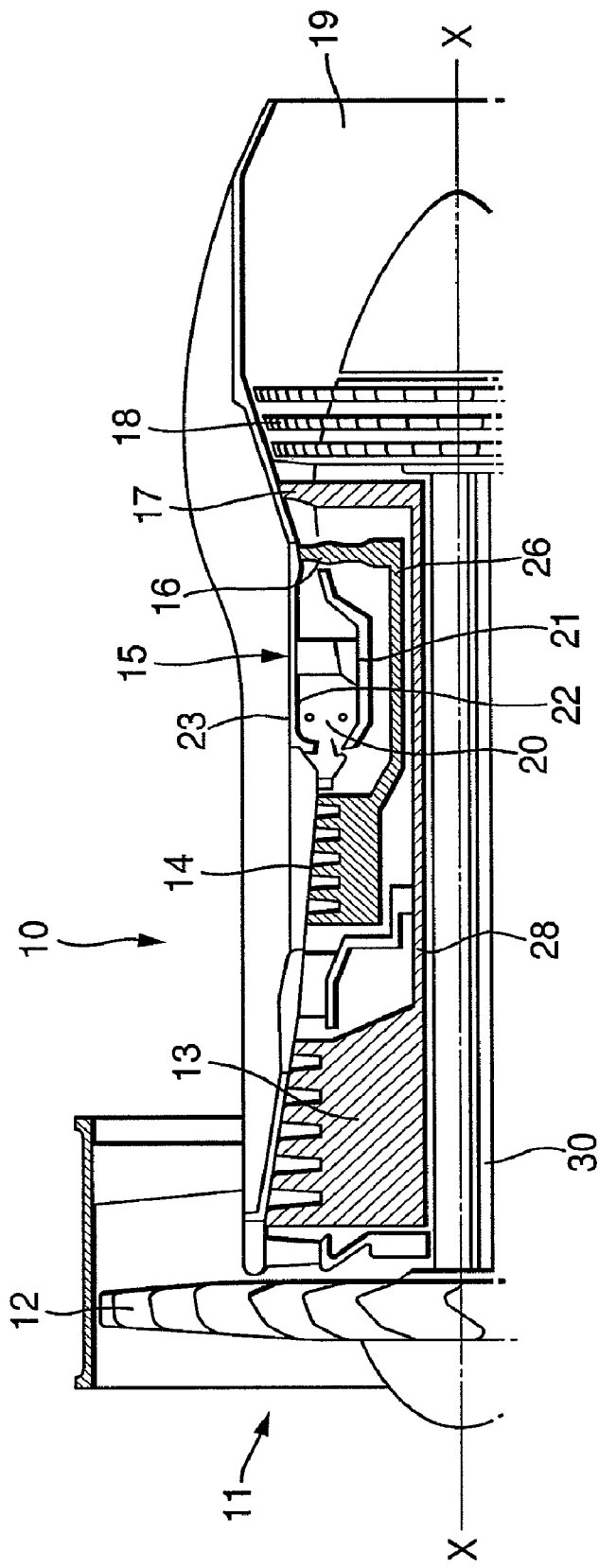
FIG. 1 is a sectional side view of a gas turbine engine.
Figure 2:
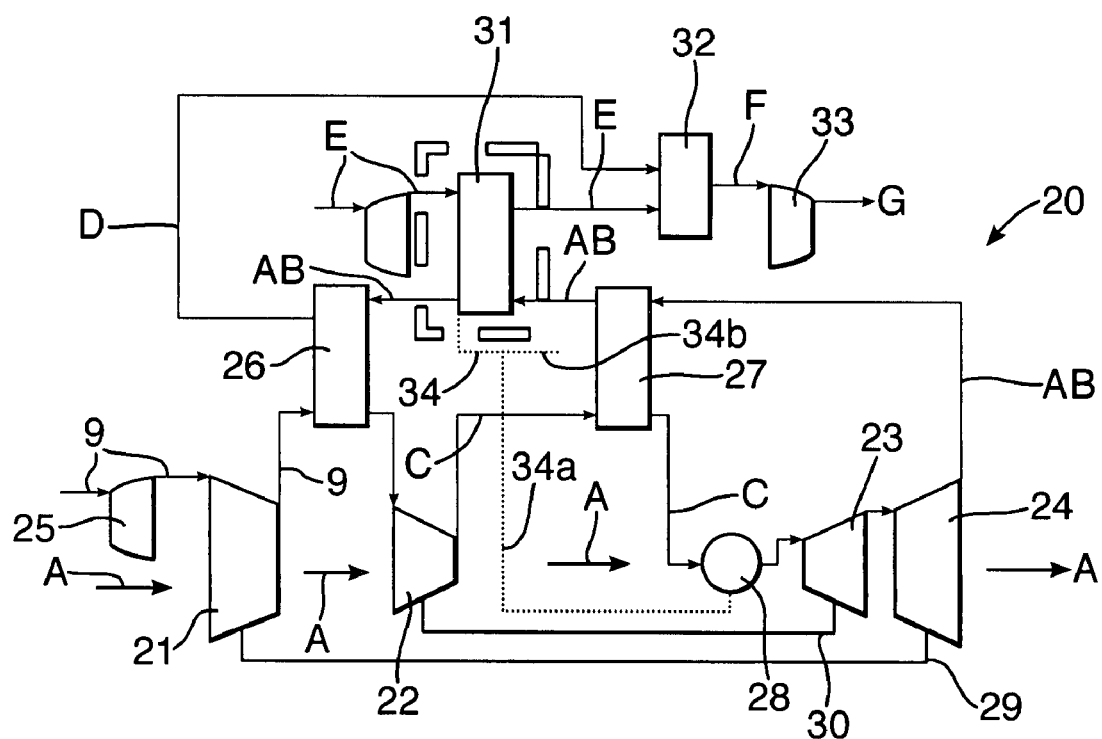
FIG. 2 is a schematic block diagram of a gas turbine engine in accordance with aspects of the present invention.

By aspects of the present invention a heat exchanger arrangement causes super-saturation with regard to the exhaust gas flows from a gas turbine engine. The heat exchanger arrangement is utilised in order to dehumidify those exhaust gas flows. FIG. 2 provides a schematic illustration of the elements of a gas turbine engine 20 in accordance with aspects of the present invention. Thus, the engine 20 has a two spool configuration between a low pressure compressor stage 21, a high pressure compressor stage 22, a high pressure turbine stage 23, and a low pressure turbine stage 24. As can be seen, the general fluid flow passes in the direction of arrowheads A through the engine 20. A proportion of compressed air flow A passes from the compressor 21 in order to be cooled in an intercooler 26. The cooled compressed air passing through the intercooler 26 is returned to the high pressure compressor stage 22 for thrust improvement. The engine 20 also incorporates a recuperative stage in the form of the heat exchanger 27 which recovers heat from the exhaust gas flow AB. The recuperator stage 27 exchanges heat with the compressed air flow C in order to increase the temperature of that flow C presented to a combustor 28. As can be seen, the low pressure compressor 21 and low pressure turbine 24 are coupled together by a shaft 29 whilst the high pressure compressor 22 and high pressure turbine 23 are coupled together through a shaft 30. The shafts 29, 30 are generally concentric and allow location of the compressor 21, 22 and turbine 23, 24 stages for appropriate propulsion through the engine 20 whilst the heat exchangers 26, 27, as well as conduit pathways, act to provide thrust recovery and energy conservation.

In accordance with aspects of the present invention, a condensation heat exchanger stage 31 is provided between the recuperator stage 27 and the intercooler stage 26. The exchanger 31 cools exhaust gas flow AB to approach super-saturation in order to dehumidify that exhaust gas flow AB prior to intercooler 26. Expended flow D then passes through by-pass ducting to a mixer 32 to be mixed with the coolant flow E through the condensation stage 31. This coolant flow E is generally an ambient air flow when used as indicated in order to reduce the temperature of the exhaust gas flow AB through a super-saturation level such that there is dehumidification through precipitation of condensation from the flow AB. The spent coolant flow E and spent exhaust gas flow D through the heat exchanger arrangement comprising stages 26, 27, 31 is then released through a by-pass nacelle 33 and any flow F is further mixed with the general engine by-pass flows in operation to provide a final exhaust flow G.

In the above circumstances, it will be understood that the exhaust gas flows are directed through the heat exchanger arrangement firstly by presenting that flow AB to the recuperator stage 27 then the condensation stage 31 and finally to the inter cooler stage 26 such that heat is withdrawn from the flow AB for use with respect to general engine heat recovery and energy conservation. However, in accordance with the present invention a particular advantage is that the exhaust gas flow D from the inter cooler stage 26 is relatively dry such that when mixed with the coolant air flow E from the condensation heat exchanger stage 31 there is a reduction in the condensate/water content within the final output exhaust flow G as well as a lowered temperature in that flow G in comparison with a situation without the condensation exchanger 31. It will be understood that reduced moisture content within the flow will also reduce the likelihood of contrail formation as the engine operates at high altitudes and low environmental temperatures.

As indicated the condensation heat exchanger stage 31 is designed to dehumidify the exhaust gas flows AB and in such circumstances the liquid condensate from the stage 31 must be accommodated. Typically in use this condensate will essentially comprise water which can be re-circulated within the engine. In FIG. 2 dotted line 34 schematically illustrates a conduit path for the condensation liquid. As can be seen, a proportion of the condensate 34a can pass to the combustor 28 in order to adjust water to fuel ratios and facilitate appropriate engine operation. Another proportion of the condensate 34b can be either stored for disposal later or released into the atmosphere in any phase but preferably the liquid phase where it will simply precipitate to ground level.

It will be understood that condensation also scavenges exhaust gas flows AB of soot particles and sulphur species. Furthermore, by adding cooling water to fuel ratios in the combustor 28, a temperature adjustment in the combustor 28 can be achieved in order to facilitate a reduction in nitrogen oxide emissions.

Figure 3:
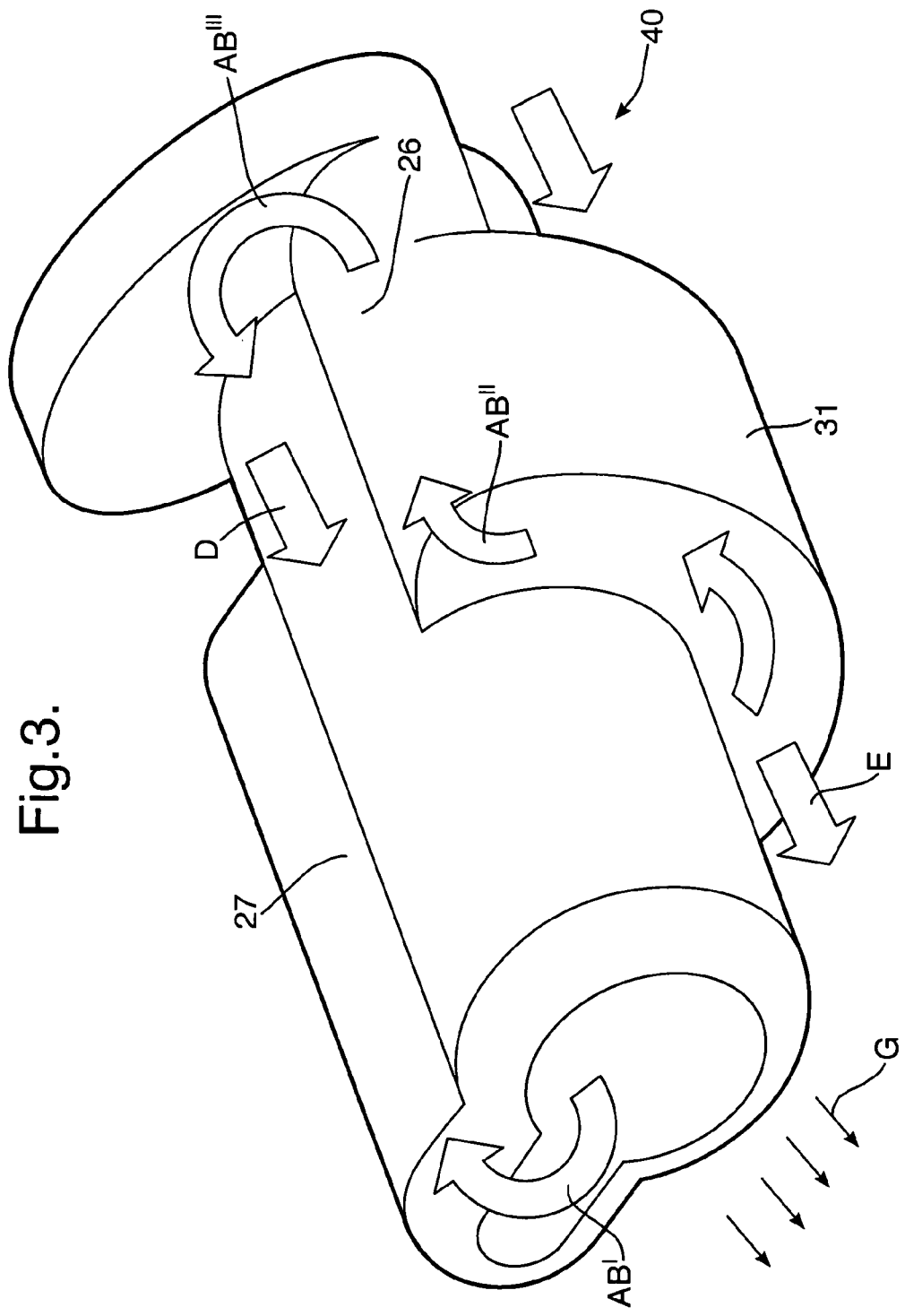
FIG. 3 is a schematic front perspective view illustrating gas flows in accordance with aspects of the present invention.

FIG. 3 provides a perspective view of an engine 40 as seen toward an exhaust end of that engine 40. For comparison, similar nomenclature with regard to gas flows as used with regard to FIG. 2 has also been applied to FIG. 3. Thus, an initial exhaust gas flow AB' passes into the recuperative stage 27 with a spent flow AB" then passing into a condensation stage 31 where it is further cooled to super-saturation such that the output exhaust gas flow AB''' enters an intercooler stage 26 and the spent exhaust gas flow D exits to mix with other bypass flows to provide the final output flow G. It will be appreciated that the arrangement depicted in FIG. 3 will generally be surrounded by a nacelle to provide conduits through the exhaust end of the engine 40.

In the above circumstances, FIG. 3 illustrates the principal conduit gas flow paths through the engine 40 at its exhaust end. It will be appreciated the cooled exhaust $AB^I$ is redirected through the recuperator stage 27 where it acts upon pre-combustive air as described above and then passes into a condensation stage where ambient air is used to further cool the exhaust gas flow $AB^{II}$ for water condensation and subsequently the ambient air after the intercooler stage 26 is used to chill the air flow between the compressor stages 21, 22 mixes with the by-pass air, that is to say the ambient air coolant from the condensation heat exchanger stage 31 for appropriate release as a final exit flow G. In such circumstances the exhaust gas flow is dehumidified at the same time other noxious elements such as soot or sulphur species are also precipitated out of the flow G from the engine 40. Nevertheless, one advantage of aspects of the present invention is drying of the exhaust flow in order to reduce formation of contrails and induced cirrus clouds.

Figure 4:
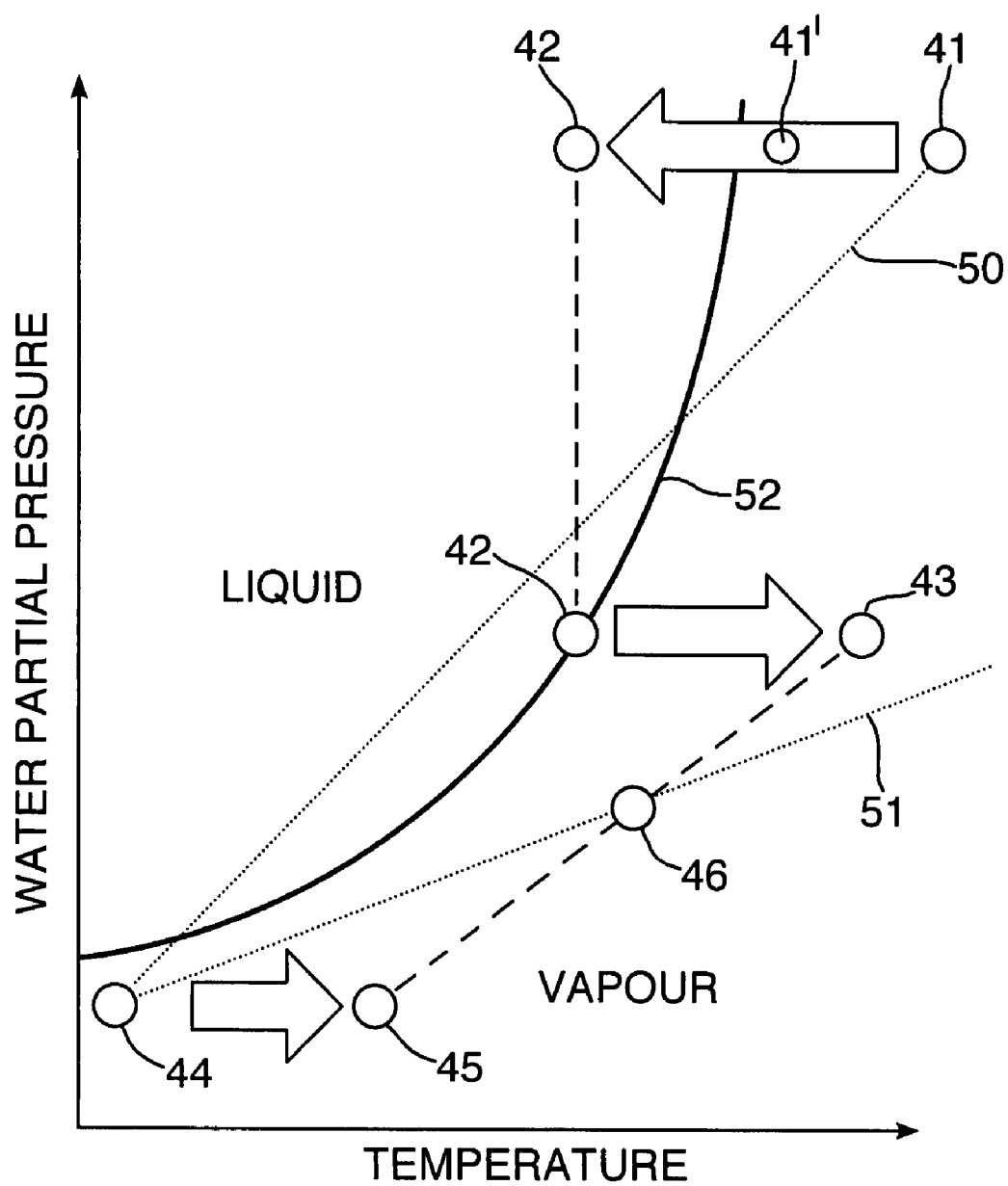
FIG. 4 is a water phase diagram illustrating water partial pressure for exhaust gas flows in accordance with aspects of the present invention.

An analysis of benefits of shifting temperature and humidity level within the exhaust gas flows is provided through the water phase diagram depicted in FIG. 4. It can be seen sufficient dehumidification is achievable without unacceptably compromising thermal efficiency in a gas turbine engine and clearly in aviation applications it is important that such benefits are achieved through use of only small to moderately sized heat exchangers in the condenser stage 31 as described above with regard to FIGS. 2 and 3. Nevertheless it will be understood that the necessary size of heat exchanger will depend upon particular operational conditions in terms of compressor ratios, thermal efficiency and necessary heat exchanger temperature differences in order that the mixed final exhaust flow is appropriate to avoid formation of contrails that is to say condensation trails from the exhaust plume of the gas turbine engine.

As indicated above, FIG. 4 provides a water phase diagram illustrating the water phases during the dehumidification process in accordance with aspects of the present invention. Thus, the cooling in the recuperator stage and the condensation stages of the heat exchanger arrangement takes place theoretically along the line 41 to 42. The actual water partial pressure is defined by an actual saturation pressure for water itself reduced for curved surfaces such as those present within a gas turbine engine through the Kelvin effect and in the presence of other species in the exhaust gas flow such as sulphuric acid and soot. An increase in temperature occurs in the intercooler heat exchanger stage between point 42 and point 43 as described above as the compressed air flow is cooled between the low pressure compressor stage and the high pressure compressor stage. In such circumstances the increase in temperature in the coolant air (ambient or by-pass air) in the condensation heat exchanger will occur along an actual mixing line 50 between gradient points 44 and 45. Mixing of point 43 and point 45 (heated coolant) results as indicating in an actual mixing line 51 with a resultant water partial pressure for temperature at a point 46 on the line 51. However, this mixing of point 43 and point 45 condensations can also occur in the exhaust plume of an engine. It will be noted that the actual mixing line 51 between ambient temperature 44 and resultant temperature 46 is reduced significantly compared to the theoretical mixing line 50 without dehumidification through the condensation stage of the heat exchange arrangement in accordance with aspects of the present invention. The mixing line 50 does not necessarily have to pass through point 41. Most importantly, the line 51 does not cross a phase transition illustrated by saturation pressure line 52. There is no phase transition because in this region there is saturation that is to say either water→ice or vapour→water. The exhausted gas flows (G in FIGS. 2 and 3) at water partial pressure for temperature at point 46 indicates that there will not be any formation of condensation trails. It will be appreciated that mixing of the by-pass air and exhaust gas flow cool air is beneficial since it has the effect that the actual mixing line 51 slope between 44 and 46 is lower than the slope between 44 to 43. It will be noted at point 42 the flow could be exhausted from the engine.

It will be understood that point $42^H$ represents a super saturated state for flow which condenses to a condensation stage or state $42^I$ as it condenses. Thus, line 51 indicates points where there will be no contrails formed whilst line 50 would indicate that there is a possibility of contrail formation dependent upon conditions.

Although it has been proposed to use intercooler and recuperator stages in a heat exchanger arrangement previously these approaches were in order to achieve greater thermal efficiency through energy recovery. Aspects of the present invention can utilise these intercooler and recuperator stages as part of or additional to provide a condensation stage in a heat exchanger arrangement in order to provide the advantage of a cooler exhaust gas flow with reduced temperature difference in order to achieve water super-saturation within the engine for dehumidification purposes.

In accordance with aspects of the present invention as indicated water content within the exhaust gas flows is removed to reduce the potential for condensation trails (contrails) and contrail cirrus clouds which may have environmentally detrimental effects. Furthermore, soot and sulphurous species are scavenged during the water condensation precipitation process which further prevent the formation of aviation induced cirrus clouds. It will also be understood that $CO_2$ emissions are reduced if intercooler and recuperator stages are provided within the heat exchanger arrangement. Nitrogen oxide emissions are reduced by use of the water condensate being injected to the combustor to achieve a secondary effect by limiting the maximum flame temperatures in the combustor. By aspects of the present invention a generally known gas turbine engine configuration can be adapted to reduce water content in the final exhausted gas flows for beneficial effects. The present arrangement may allow present engine technologies to be adapted rather than necessitating fundamental changes to those engine configurations. Although aspects of the present invention are particularly directed to provision of a condensation stage in the heat exchanger arrangement as indicated, this condensation stage can be combined with intercooler and recuperator heat exchanger arrangement stages for an overall benefit both in relation to dehumidification as well as thermal efficiency. Integration of the condensation stage with intercooler and recuperator stages may result in a reduced overall weight penalty for provision of the heat exchanger in comparison with a component by component heat exchanger arrangement to provide the individual effects of condensation dehumidification, intercooling and recuperator effects upon the exhaust gas flows.

Typically, a gas turbine engine will utilise a fuel such as kerosene in order to drive propulsion and therefore the exhaust gas flows but it will be understood that other fuels may be used.

Aspects of the present invention may be utilised with regard to pulse detonation, that is to say constant volume combustion or any core engine which reduces LP turbine exit temperature instead of deflagration, that is to say constant pressure combustion in a gas turbine engine configuration. Such pulse detonation may lower exhaust gas flow temperatures initially and hence the necessary size of particularly the condensation heat exchanger as well as increasing thermal efficiency.

It will also be understood that aspects of the present invention may be utilised with regard to open rotor devices as the core size is reduced allowing use of more compact and lighter heat exchangers. Furthermore, there is improvement with respect to fuel burning due to higher propulsive efficiency in accordance with aspects of the present invention.

Although described above with regard to aviation applications, it will be understood that a gas turbine engine in accordance with aspects of the present invention may be utilised in other situations such as with regard to marine propulsion when there will be fewer constraints with regard to weight or volume with respect to the power device and therefore the acceptability of use of heat exchangers for condensation removal and thermal efficiency may be more accepted.

It will be understood that the various gas flows through an engine in accordance with aspects of the present invention may be regulated by regulation valves in the form of baffles or otherwise in the conduit paths and by-pass nacelles of the engine. Thus, greater control of the de-humidifying effects can be achieved by altering flow rates of at least a proportion of the flows.

The present invention is applicable to both three and two shaft gas turbine engines used in aero-marine or industrial applications. Furthermore, although described with the coolant flow generally provided by ambient or adjacent air flows it will be understood with respect to marine engines in particular water may be used as the coolant for at least part of the heat exchanger arrangement such as the condensation stage.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:

1. A gas turbine engine comprising a heat exchanger arrangement for exhaust gas flows, wherein at least a part of the heat exchanger is constructed to dehumidify the exhaust gas flows in use by precipitation of condensation through super-saturation inducement relative to exhaust gas flow temperature and rate, and the heat exchanger arrangement comprises:
   a recuperative stage to recuperate heat in use from the exhaust gas flows to heat a combustion gas flow or pre-heat a gas flow before the combustion gas flow or gas flow combusts;
   an intercooler stage to cool the compressed gas flows; and
   a condensation stage between said recuperative stage and said intercooler stage, the condensation stage using a cooler fluid such as a bypass/fan flow or water to cool the exhaust flows after the recuperative stage.

2. An engine as claimed in claim 1 wherein the heat exchanger arrangement has conduit paths for exhaust flows from the inter cooler stage in order to provide mixing with spent ambient air flows from the condensation stage.

3. A gas turbine engine according to claim 1, wherein at least a part of the heat exchanger is constructed to dehumidify the exhaust gas flows in use by precipitation of condensation through super-saturation inducement relative to exhaust gas flow temperature and rate, and the heat exchanger arrangement has a conduit path for presenting condensate to a combustor, wherein the condensate or water added to the combustor is to adjust temperatures for a reduction in NOx emissions.

4. An engine as claimed in claim 3 wherein the condensate presented to the combustor is to adjust water/fuel ratio or to facilitate water injection.

5. An engine as claimed in claim 3 wherein the condensate or water injected directly into the combustor is available continuously.

6. An engine as claimed in claim 3 wherein the conduit path includes a collector for condensate and for distribution along the conduit path.

7. A method of operating a gas turbine engine comprising:
presenting exhaust gas flows to a condensation stage of a heat exchanger arrangement in order to dehumidify the exhaust gas flow and produce a condensate; and
mixing the exhaust gas flows after the dehumidification stage with bypass air flows within the engine in order to provide a final output exhaust gas flow having a temperature and water partial pressure below a eutectic phase transition between liquid and vapor to avoid formation of condensation trails.

8. An method according to claim 7, wherein the exhaust gas flow is dehumidified by precipitation of condensation through super-saturation inducement relative to exhaust gas flow temperature.

9. A method according to claim 7, further comprising presenting the condensate from the dehumidification step to the combustor to adjust water/fuel ratio or to facilitate water injection.

10. A method according to claim 7, further comprising presenting the condensate from the dehumidification step to the combustor to adjust temperatures for a reduction in NOx emissions.

* * * * *